United States Patent [19]
Aldworth

[11] Patent Number: 5,935,197
[45] Date of Patent: Aug. 10, 1999

[54] DATA PROCESSING CIRCUIT AND METHOD OF OPERATION PERFORMING ARITHMETIC PROCESSING ON DATA SIGNALS

[75] Inventor: Peter James Aldworth, Cambridge, United Kingdom

[73] Assignee: Arm Limited, Cambridge, United Kingdom

[21] Appl. No.: 08/824,015

[22] Filed: Mar. 21, 1997

[51] Int. Cl.[6] ................................ G06F 7/52; G06F 7/48
[52] U.S. Cl. .................. 708/200; 708/625; 708/620; 708/628; 708/190
[58] Field of Search .......................... 364/715.011, 712, 364/736.01, 736.02, 757, 754.01, 760.01; 395/562

[56] References Cited

U.S. PATENT DOCUMENTS

| | | | |
|---|---|---|---|
| 4,153,938 | 5/1979 | Ghest et al. | 364/760 |
| 4,864,529 | 9/1989 | Shah et al. | 364/760 |
| 5,151,875 | 9/1992 | Sato | 364/784 |
| 5,426,599 | 6/1995 | Machida | 364/760 |
| 5,444,835 | 8/1995 | Turkowski | 395/135 |
| 5,457,804 | 10/1995 | Ohotomo | 395/800 |
| 5,561,810 | 10/1996 | Ohotomo | 395/800 |
| 5,625,764 | 4/1997 | Tsujimoto et al. | 395/135 |

*Primary Examiner*—Ayaz R. Sheikh
*Assistant Examiner*—Tim Vo
*Attorney, Agent, or Firm*—Nixon & Vanderhye P.C.

[57] ABSTRACT

The present invention provides a data processing circuit and method for performing arithmetic processing on data signals input to the circuit, comprising: a plurality of input terminals for receiving a plurality of data signals to be processed; a plurality of interconnected arithmetic processing units, one corresponding to each input terminal, for processing the data signals received at the corresponding input terminal; and a selector for routing the data signals at said input terminals to the corresponding arithmetic processing units in a first mode of operation, or for routing a selected one of said data signals to said plurality of arithmetic processing units in a second mode of operation; whereby, in said first mode of operation, data signals arriving at said input terminals are processed in parallel by said corresponding arithmetic processing units, and, in said second mode of operation, at any point in time, one of said data signals is processed by said plurality of arithmetic processing units. By this approach, the data processing circuit is provided with two modes of operation, the first mode of operation corresponding to a fast, reduced precision mode of operation, whilst the second mode of operation corresponds to a slower but higher precision mode of operation. The same hardware is reused for both modes of operation, thereby reducing the hardware requirements and so enabling the circuit to be relatively small.

13 Claims, 5 Drawing Sheets

DATA PROCESSING CIRCUIT AND METHOD OF OPERATION PERFORMING ARITHMETIC PROCESSING ON DATA SIGNALS

BACKGROUND OF THE INVENTION

1. Field of the Invention

The present invention relates to data processing circuits and methods of operation of such circuits, and in particular to a data processing circuit, and method of operation, for performing arithmetic processing on data signals input to the circuit.

2. Description of the Prior Art

Generally, when developing data processing circuits, such as integrated circuits, there is a desire to keep the circuit as small as possible. The space that an integrated circuit occupies is at a premium. The smaller an integrated circuit is, the less expensive it will be to manufacture and the higher the manufacturing yield. For this reason, measures that reduce the size of an integrated circuit are strongly advantageous.

Often a data processing circuit will be designed to have a number of modes of operation, and when developing such a data processing circuit, it is sometimes necessary to provide circuit elements that are used solely for particular modes of operation of the data processing circuit. With regard to the different modes of operation, there may be a requirement for a high speed, but relatively low precision processing mode, and a lower speed, but relatively high precision processing mode. As an example, in a first mode of operation, an arithmetic processing function, such as an addition, subtraction, multiplication or division function, may need to be applied at high speed to data signals input to the circuit. However, in a second mode of operation, the requirement for high speed may be sacrificed in order to enable a higher precision arithmetic processing operation to be performed.

One way to implement a data processing circuit with two such modes of operation is to provide a number of arithmetic processing units used in the high speed, low precision mode of operation, and some further, larger arithmetic processing units used in the slower, higher precision mode of operation.

However, the provision of separate arithmetic processing units for each mode of operation does not assist in the general aim of trying to keep the processing circuit as small as possible, since, in any particular mode of operation, there will be arithmetic processing units which are not being used. Clearly, if the number of elements used in the data processing circuit could be reduced, this would enable the size of the chip to be reduced, thereby reducing the cost.

Another general aim when developing data processing circuits is to try and reduce the power consumption of those circuits. It is becoming more commonplace for integrated circuits to be used in products which operate from battery power, such as portable laptop computers, mobile phones, personal organisers, etc. In such situations, it is clearly desirable to reduce the power consumption of these processing devices as much as possible, in order to improve the battery life of the products, i.e. the amount of time the products can be used for before needing to replace or recharge the batteries. However, it is not just in the area of battery powered products where power consumption is a concern. The higher the power consumption, then the greater the heat generated by the integrated circuit. Hence, there is generally a desire to reduce power consumption wherever possible.

Generally, the more circuit elements provided on the data processing circuit, the greater the power consumption, and this is another reason why it is desirable to reduce the number of circuit elements wherever possible.

Hence, it is an object of the present invention to provide a data processing circuit for performing arithmetic processing on data signals, which has a plurality of modes of operation, and which requires less arithmetic processing units than the above described prior art data processing circuits.

SUMMARY OF THE INVENTION

Accordingly, the present invention provides a data processing circuit for performing arithmetic processing on data signals input to the circuit, comprising: a plurality of input terminals for receiving a plurality of data signals to be processed; a plurality of interconnected arithmetic processing units, one corresponding to each input terminal, for processing the data signals received at the corresponding input terminal; and a selector for routing the data signals at said input terminals to the corresponding arithmetic processing units in a first mode of operation, or for routing a selected one of said data signals to said plurality of arithmetic processing units in a second mode of operation; whereby, in said first mode of operation, data signals arriving at said input terminals are processed in parallel by said corresponding arithmetic processing units, and, in said second mode of operation, at any point in time, one of said data signals is processed by said plurality of arithmetic processing units.

The data signals processed are typically n-bit data signals which are routed by the selector to corresponding arithmetic processing units via suitable paths such as buses. In accordance with the present invention, a plurality of interconnected arithmetic processing units are provided within the data processing circuit, these interconnected arithmetic processing units being used in both a first mode of operation and a second mode of operation. In a first mode of operation, data signals received by the data processing circuit are processed in parallel by the arithmetic processing units, thereby providing a fast technique for processing the input data signals. Further, in a second mode of operation, the interconnected arithmetic processing units are used in series, such that, at any point in time, only one of the input data signals is processed by the plurality of interconnected arithmetic processing units. Generally one input data signal is processed during a first clock cycle, a second data signal is processed during a second clock cycle, etc until all of the input data signals have been processed, at which point the first input data signal is processed in the next clock cycle, and so on. This second mode of operation is clearly not as fast as the first mode of operation, but enables a higher precision arithmetic processing function to be applied, since all of the arithmetic processing units can be used to process one input data signal.

By the above approach, the hardware required for a data processing circuit to be able to perform arithmetic processing in either the first or the second modes of operation is reduced, since the same set of interconnected arithmetic processing units are used in both modes of operation. Thus, in accordance with the invention, the arithmetic processing units are split such that those units can act as a single, high precision arithmetic processing unit in the second mode of operation, and also operate as several independent, reduced precision arithmetic processing units in the first mode of operation.

In preferred embodiments, the present invention further comprises a first adder circuit for receiving processed data signals output by said arithmetic processing units in said second mode of operation, and for generating an output signal corresponding to the combined outputs of said plurality of arithmetic processing units. This enables the various output signals generated by each of the arithmetic processing units in the second mode of operation to be combined in order to produce a single output signal.

Preferably, the data processing circuit further comprises a plurality of adder circuits, one corresponding to each of said arithmetic processing units, each adder being arranged in said first mode of operation to receive the processed data signals output by the corresponding arithmetic processing unit, and to generate a result determined by adding a number of said processed data signals output by said corresponding arithmetic processing unit. In preferred embodiments, the arithmetic processing units generate partial product results, and the adders are then used to generate a final result based on the summation of these partial product results.

In preferred embodiments, one of said plurality of adder circuits comprises said first adder circuit, said first adder circuit being arranged in said first mode of operation to receive processed data signals only from the corresponding arithmetic processing unit, and in said second mode of operation to receive processed data signals output by said plurality of arithmetic processing units. This arrangement again helps to minimise the number of circuit elements used in the data processing circuit, thereby enabling the size of the data processing circuit to be reduced. Hence, in this arrangement, the adder used in the second mode of operation to combine the outputs from the various interconnected arithmetic processing units is also used in the first mode of operation to sum the various partial product results received from a single corresponding arithmetic processing unit.

Preferably, said arithmetic processing units are summand generator units which are arranged to receive a multiplier value and to apply said multiplier value to data signals passed to said summand generator units by said selector in order to generate partial products. In preferred embodiments, the summand generator units contain one or more summand generators, the number of summand generators being dependent on the number of bits in the multiplier value.

Further, each said summand generator unit other than a first summand generator unit preferably has an input for receiving, in said second mode of operation, one or more least significant bit values of said multiplier value, said one or more least significant bit values received at said input of each said summand generator unit being generated by a preceding one of said interconnected summand generator units. In preferred embodiments, said one or more least significant bit values received at said input of each said summand generator unit are one or more most significant bit values of the multiplier value from said preceding interconnected summand generator unit. This interconnection arrangement enables the summand generator units to operate in dependence on one another when used in the second mode of operation to process a selected one of said input data signals. In the first mode of operation, the value received at the input of each said summand generator unit is preferably set to a logical '0', thereby decoupling the summand generator units and enabling them to act independently to process data signals in parallel.

Preferably the summand generator units are Booth based summand generator units. It has been found that Booth based summand generator units are particularly suitable for use in the data processing circuit as described above.

Further, in preferred embodiments, the data signals are digital video signal streams. Colour video systems require three components per video stream, and, as will be discussed in more detail later, these three components are used to produce three input data signals passed to the data processing circuit.

A data processing circuit in accordance with the present invention can be used in any system where there may be requirement for a high precision arithmetic operation in one mode, and several reduced precision arithmetic operations in another mode. One particularly suitable application is that of digital video sub-systems that need to display two video streams on one display device. Blending two video streams allows for cross-fade between picture sources, picture-in-picture displays or caption overlays on pictures.

A typical application for this is a digital Set-Top Box (STB). These devices allow video streams to be mixed with computer graphics, the result typically being displayed using a television set.

Hence, viewed from a second aspect, the present invention provides an alphablender circuit, comprising a data processing circuit in accordance with the present invention. Alphablending requires that all of the components of two video streams are blended to produce a result that is a mix of the two streams. An alphablending circuit is typically used in a colour video system to produce a mix of two input video streams, for example a conventional video stream and a computer generated graphic signal. The amount of each video stream in the final mix is controlled by the multiplier value provided to the various summand generator units. Varying this value allows a cross-fade of the two video streams to be controlled.

Viewed from a third aspect, the present invention provides a method of operating a data processing circuit to perform arithmetic processing on data signals input to the circuit, the method comprising the steps of: receiving at a plurality of input terminals a plurality of data signals to be processed; determining a mode of operation of the data processing circuit; in a first mode of operation, routing the data signals at said input terminals to corresponding arithmetic processing units for processing, the data processing circuit comprising a plurality of interconnected arithmetic processing units, one corresponding to each input terminal; and in a second mode of operation, selecting one of said data signals and routing that data signal to said plurality of arithmetic processing units for processing; whereby, in said first mode of operation, data signals arriving at said input terminals are processed in parallel by said corresponding arithmetic processing units, and, in said second mode of operation, at any point in time, one of said data signals is processed by said plurality of arithmetic processing units.

The mode of operation of the data processing circuit is typically configured by software. For example, if the data processing circuit is used to perform an alphablending function on digital video signals to be displayed, the mode of operation would typically be configured by software depending on whether the display device has high speed/high pixel resolution (resulting in lower colour resolution) or low speed/low pixel resolution (resulting in higher colour resolution).

BRIEF DESCRIPTION OF THE DRAWINGS

An embodiment of the invention will be described hereinafter, by way of example only, with reference to the accompanying drawings in which like reference signs are used for like features, and in which.

DESCRIPTION OF A PREFERRED EMBODIMENT

For the purpose of illustrating a preferred embodiment of the present invention, a Booth multiplier circuit used to perform an alphablending function for a colour video system will be described. As mentioned earlier, alphablending requires that all of the components of two video streams are blended to produce a result that is a mix of the two streams. Colour video systems require three components per video stream, and an alphablending function performs a multiplication on signals representing each component under the control of a multiplier value that determines the amount of each video stream in the final mix. A standard Booth multiplier circuit is illustrated in FIG. 1A.

Figure 1A:
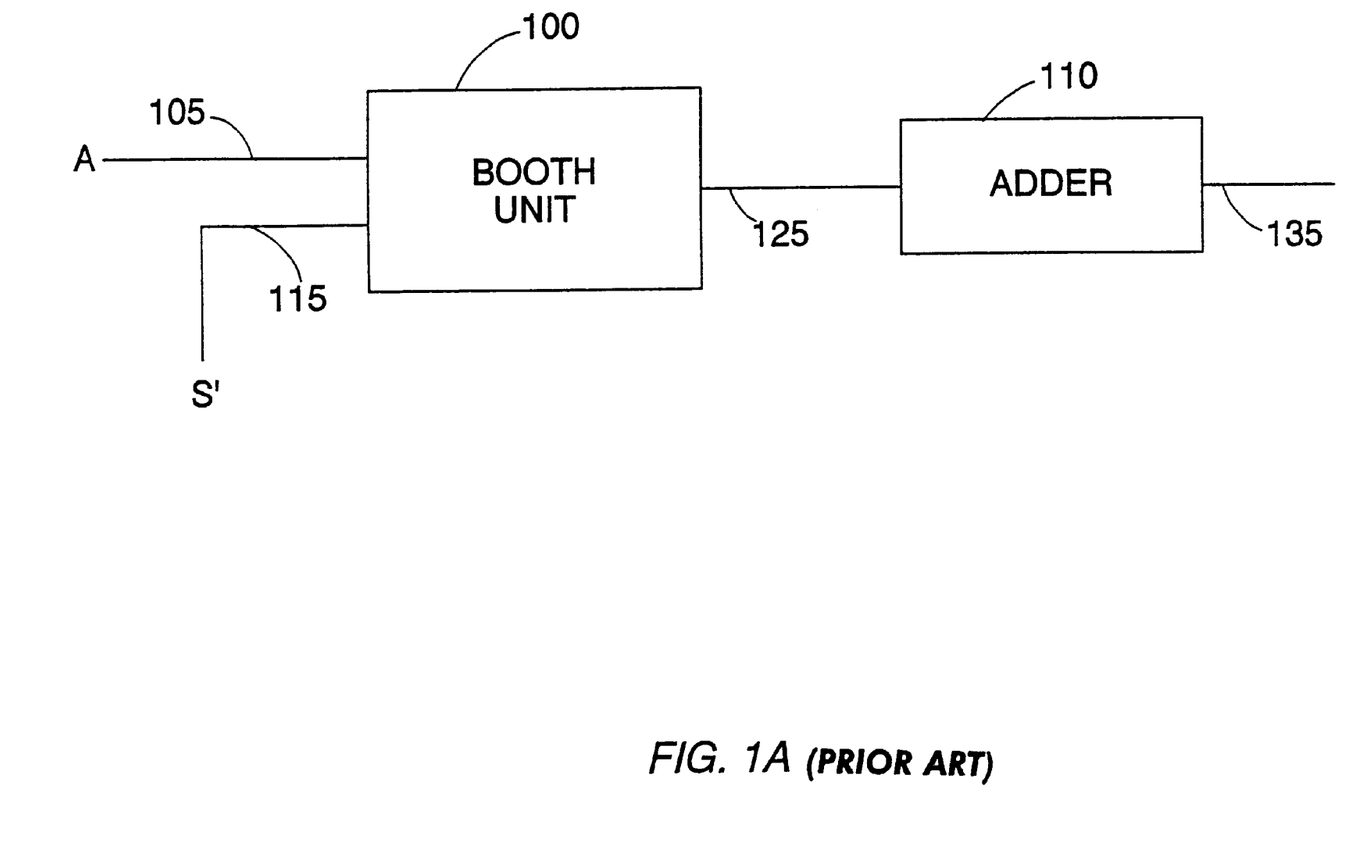
FIGS. 1A and 1B illustrate a standard Booth system of the prior art.

With reference to FIG. 1A, a signal A representing a component of a video stream is input over path 105 to a Booth unit 100. Additionally, a multiplier value S' used to control the amount of each video stream in the final mix is supplied over path 115 to Booth unit 100. The Booth unit 100 is arranged to perform the following calculation:

$$I = A \times S'$$

The Booth unit 100 generates partial products that are passed over line 125 to the adder 110, which sums the partial products to create the final result, I, which is output on line 135.

If S' is an n-bit number, then n/2 partial products are generated. The Booth unit 100 is arranged to contain n/2 Booth based summand generators, each of which are controlled by a subsection of the S' bus. These are arranged as overlapping triplets such that the first Booth based summand generator is connected to bits 0 and 1 of S', and its least significant bit connected to 0. The next Booth based summand generator is then connected to bits 1, 2 and 3 of S', and the next to bits 3, 4, 5, and so on.

In preferred embodiments, the Booth units are based on a Modified Booth algorithm. The Modified Booth algorithm is described as 2-bit Booth recoding on page 141, Section 3.25, of "Computer Arithmetic Systems. Algorithms, Architecture and Implementation", by Amos R. Omondi, published by Prentice Hall in 1994, ISBN 0-13-334301-4.

Figure 1B:
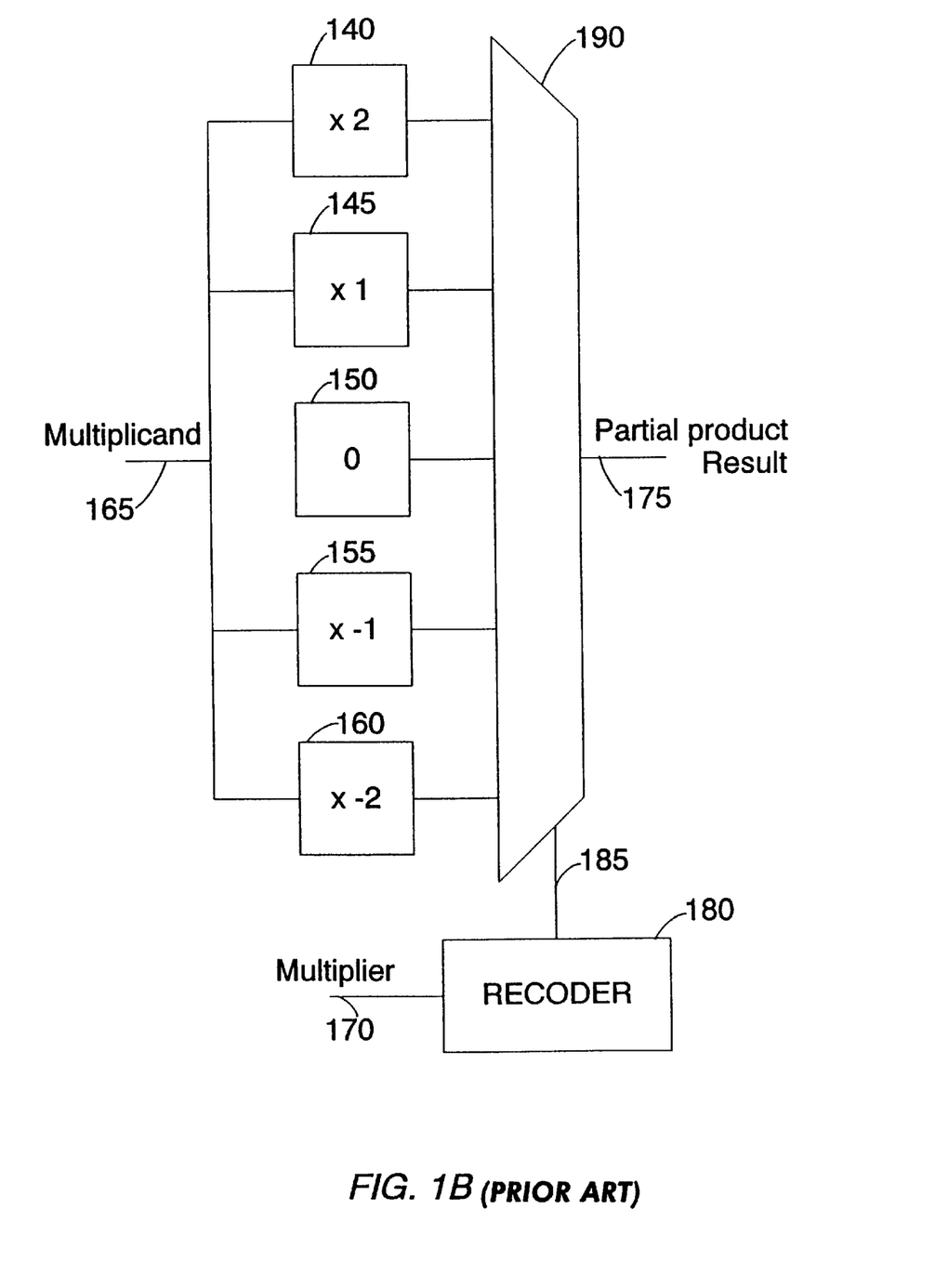

The structure of such a Booth based summand generator is illustrated in FIG. 1B. The multiplicand (eg. the signal A) is input over path 165 to logic units 140, 145, 155, 160. These logic units perform the multiplication functions indicated in FIG. 1B (for example by using shifters and/or inverters) and output the results to a multiplexer 190. Further, logic unit 150 provides a '0' value to the multiplexer 190. A predetermined subset of the bits of the multiplier S' (eg. 3 bits in preferred embodiments) is passed over path 170 to the recoder 180, which determines based on that bit information the appropriate control signal to pass over path 185 to the multiplexer 190. Based on the control signal, the multiplexer 190 will output one of the inputs from logic units 140, 145, 150, 155 or 165 as a partial product result on path 175.

If a colour video stream has three components, then three separate multiplier structures, each comprising a Booth unit 100 and an adder 110 as illustrated in FIG. 1A, will be used, one for each video stream component. A multiplication operation with a certain precision will require S' to be a certain number of bits, n. As discussed earlier, in a multiplier where S' is n bits, the Booth unit 100 must contain n/2 Booth based summand generators. Thus the three multiplier structures must each have Booth units that contains n/2 Booth based summand generators.

Hence, if an alphablending circuit is required which is able to support two modes, a second mode performing a single high precision multiplication and a first mode performing several reduced precision multiplications, then in a typical prior art system, it would be necessary to produce four multiplier structures (taking the three component example above); three with reduced precision (Booth units containing fewer Booth based summand generators) and one with high precision. In the second mode the three reduced precision multipliers are redundant and in the first mode the separate high precision multiplier is redundant.

This structure hence has two sections of circuitry that are redundant, one in each mode of operation. This indicates that the circuit may be larger than it needs to be. As discussed earlier, this tends to increase the cost of manufacturing the alphablender circuit, whilst also reducing the yield, and increasing the complexity and the power consumption of the circuit.

In the area of display technology, there is currently a need for very high speed, high pixel resolution displays and also lower speed, medium pixel resolution displays. High speed, high horizontal/vertical pixel resolution generally results in lower colour resolution, whilst low speed, low horizontal/vertical pixel resolution generally results in higher colour resolution. This is caused by memory capacity and bandwidth limitations. Further, the 'precision' of the alphablender defines the number of blending steps between 100% video stream 1, 0% video stream 2, and 0% video stream 1, 100% video stream 2. Lower resolution alphablending will tend to be used with lower colour resolution displays.

It would be desirable to provide a colour video system which could support both types of displays by being able to switch its mode of operation. However, for the above described reasons, it is clearly undesirable to have to increase the number of Booth units used to support such flexibility.

Figure 2A:
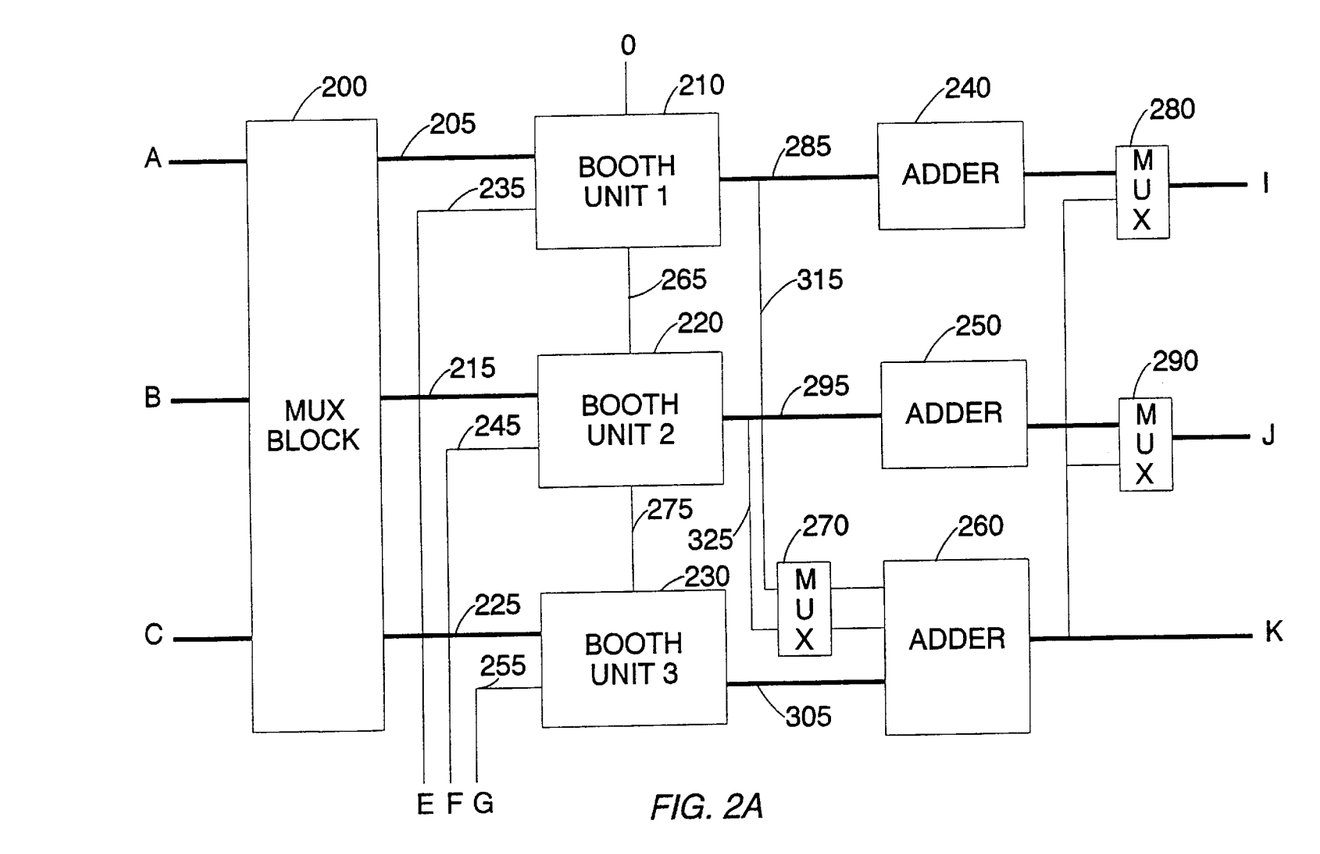
FIGS. 2A and 2B illustrate a data processing circuit in accordance with preferred embodiments of the present invention.
Figure 2B:
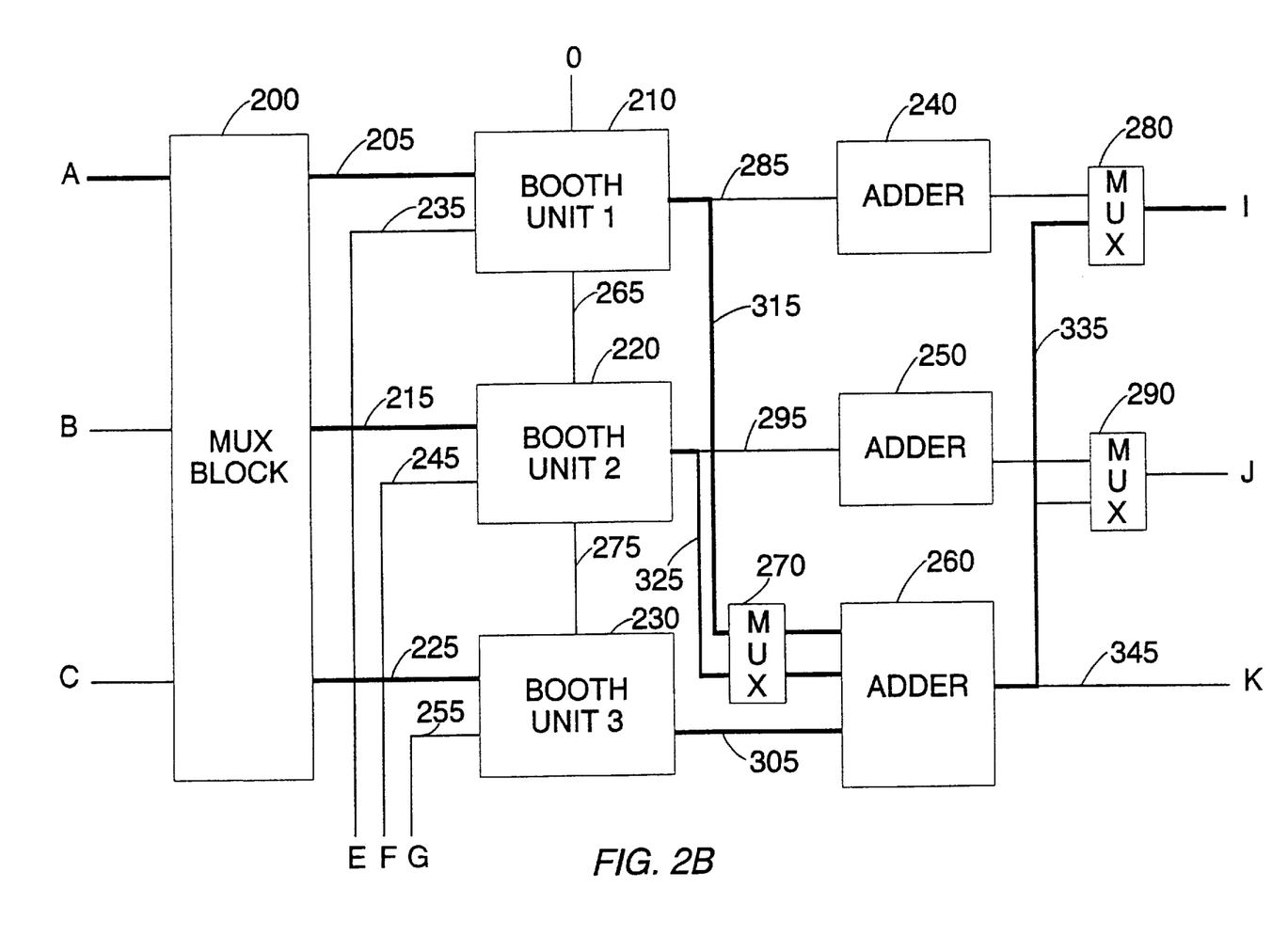

FIGS. 2A and 2B illustrate a Booth multiplier circuit in accordance with preferred embodiments of the present invention. In a first mode of operation, as illustrated in FIG. 2A, three signals A, B, C are received by a multiplexer block 200, which is arranged to route the three signals to corresponding Booth units 210, 220, 230 over corresponding paths 205, 215 and 225.

The relationship in the preferred embodiment between the three signals A, B and C and the components of the two video signal streams to be blended is as follows. The colour value components of the video stream may be in any suitable format, eg. RGB, YCrCb. For the purpose of illustration, it will be assumed that the colour values are RGB values. Then, if R1,G1,B1 are colour values of a first video stream, R2,G2,B2 are colour values of a second video stream, Rb,Gb,Bb are the blended results, and S' is considered in a normalised range (i.e. 1 to 0), then the following equations define the blended results:

$$Rb = S'.R1 + (1-S').R2$$

$$Gb = S'.G1 + (1-S').G2$$

$$Bb = S'.B1 + (1-S').B2$$

Rearranging these equations gives:

$$Rb = R2 + S'.(R1-R2)$$

$$Gb = G2 + S'.(G1-G2)$$

$$Bb = B2 + S'.(B1-B2)$$

Here R1,G1,B1 and R2,G2,B2 are two video streams, each with three colour components. The three multiplication functions performed are S'.(R1–R2), S'.(G1–G2) and S'.(B1–B2) where 'R1–R2' is A, 'G1–G2' is B and 'B1–B2' is C.

Each Booth unit 210, 220, 230 takes two values, a multiplier and a multiplicand. The multiplicand is the corresponding signal A, B, C supplied by the multiplexer block 200, whilst, in the first mode of operation, the multiplier value S', being a reduced precision value, is provided as the signals E, F and G (E=F=G=S') over paths 235, 245, 255, respectively.

Each Booth unit also has a further input which can be used in the second mode of operation to provide the least significant bit (lsb) of the multiplier value. Booth unit 210 has this input fixed at zero, whilst Booth units 220 and 230 take this input from the preceding Booth unit over paths 265 and 275, respectively. Booth units 210 and 220 generate these values using a multiplexer, and the value is set to zero in the first mode of operation or to the value of the most significant bit from that Booth unit's multiplier input in the second mode of operation, as will be discussed in more detail later.

In both modes of operation, the Booth multiplier circuit performs an operation where E, F and G form the scaling factor S', such that:

$$I = A \times S'$$

$$J = B \times S'$$

$$K = C \times S'$$

In the first mode of operation, E=F=G=S', and so S' is passed over paths 235, 245 and 255 to the corresponding Booth units 210, 220 and 230. As mentioned earlier, the multiplexer block 200 is configured such that A is passed to Booth unit 210, B to Booth unit 220 and C to Booth unit 230. Booth units 210 and 220 are configured to pass a value zero to the next Booth unit over paths 265 and 275, respectively. Partial product results are generated by Booth units 210, 220, 230 and passed to corresponding adders 240, 250, 260, respectively over corresponding paths 285, 295, 305. The adders are arranged to generate a final result on outputs I, J and K simultaneously based on summing the partial product results received over corresponding paths 285, 295, 305. In the first mode of operation, the multiplexers 280, 290 are arranged to allow the I and J signals from adders 240 and 250 through. Further, multiplexer 270 is arranged to disable any output from Booth units 210 and 220 being passed to adder 260 over paths 315 and 325, respectively. The I, J and K results are generated in a single cycle.

The above described first mode of operation corresponds to a single-cycle, reduced precision mode, which operates at high speed. Three multiplications are performed each clock cycle, enabling the I, J and K results to appear on the output simultaneously.

However, for a higher precision mode to be supported, it is necessary to provide a multiplier value having an increased number of bits. As discussed earlier, this cannot merely be done by passing higher bit multiplier values over paths 235, 245 and 255 to the Booth units, since the Booth units are configured specifically to receive a multiplier value having a specified number of bits. However, in accordance with preferred embodiments of the present invention, the higher precision mode of operation can be supported using the same hardware, as will be discussed in more detail with reference to FIG. 2B.

In this second, high precision mode of operation, S' is a value represented by E, F and G concatenated, such that G contains the most significant bits. In each cycle, the multiplexer block 200 is configured to provide the same input component on all of its multiplicand outputs. Hence, with reference to FIG. 2B, in a first cycle, component A is output over paths 205, 215, 225 to all three Booth units 210, 220 and 230. Further, Booth units 210 and 220 are configured to pass the most significant bit of the multiplier to the next unit over paths 265 and 275, respectively. The outputs of the Booth units are supplied over paths 285, 295, 305 to the adders 240, 250, 260, as in the first mode of operation. However, multiplexers 280 and 290 are arranged to disable any output from the adders 240 and 250 in the second mode of operation. Further, multiplexer 270 is arranged to allow the outputs from Booth unit 210 and Booth unit 220 provided over paths 315 and 325, respectively, to be passed to the adder 260. Hence, adder 260 receives all three outputs from the Booth units 210, 220, 230. The output of the adder 260 is then routed to the multiplexer 280 over path 335, where it is output from the multiplexer 280 and then latched.

In the next cycle, the same process is repeated for signal B, with the output of the adder 260 being provided to the multiplexer 290, where it is output and latched. Then, in the third cycle, the same process is repeated for signal C, and the output of the adder 260 is output as the value K on path 345. At the end of the third cycle, the results I, J and K are output. By this approach, a high precision multiplication function can be applied to the signals A, B and C using the same hardware circuits, but at a correspondingly lower speed. Hence, as an example, referring to the embodiment shown in FIGS. 2A and 2B, if the multiplier values E, F and G are two bit multipliers, then the first mode of operation is faster than the second mode of operation, but in the second mode of operation a six bit multiplier is used, resulting in higher precision.

The two modes that the multiplier structure illustrated in FIGS. 2A and 2B supports reflect a trade off in requirements for very high speed, high pixel resolution displays and lower speed, medium pixel resolution displays. It enables the hardware required to support the two modes of blending function to be kept to a minimum, since, in the lower speed mode of operation, the hardware can be reused for the calculation of each component in a serial fashion. In the high speed mode of operation, rather than increasing the hardware requirements so that the blender will operate at a higher speed, the accuracy of the blend is reduced to make the hardware faster. This approach has enabled a single structure to be developed which supports a reduced blending function for the high speed case, without increasing the hardware or reducing the accuracy of the low speed case. The structure described can therefore act as a single, high precision multiplier in one mode, and then operate as several independent, reduced precision multipliers in another mode.

The multiplier described above can be used in any system where there may be a requirement for a high precision multiplier in one mode and several reduced precision multipliers in another mode. It is particularly suited to digital video sub-systems that need to display two video streams on one display device. Blending two video streams allows for cross fades between picture sources, picture-in-picture displays or caption overlays on pictures.

A typical application in which an alphablending circuit in accordance with the preferred embodiment may be used is a digital Set-Top Box (STB). These devices allow video streams to be mixed with computer graphics, with the result being typically displayed using a television set.

Figure 3:
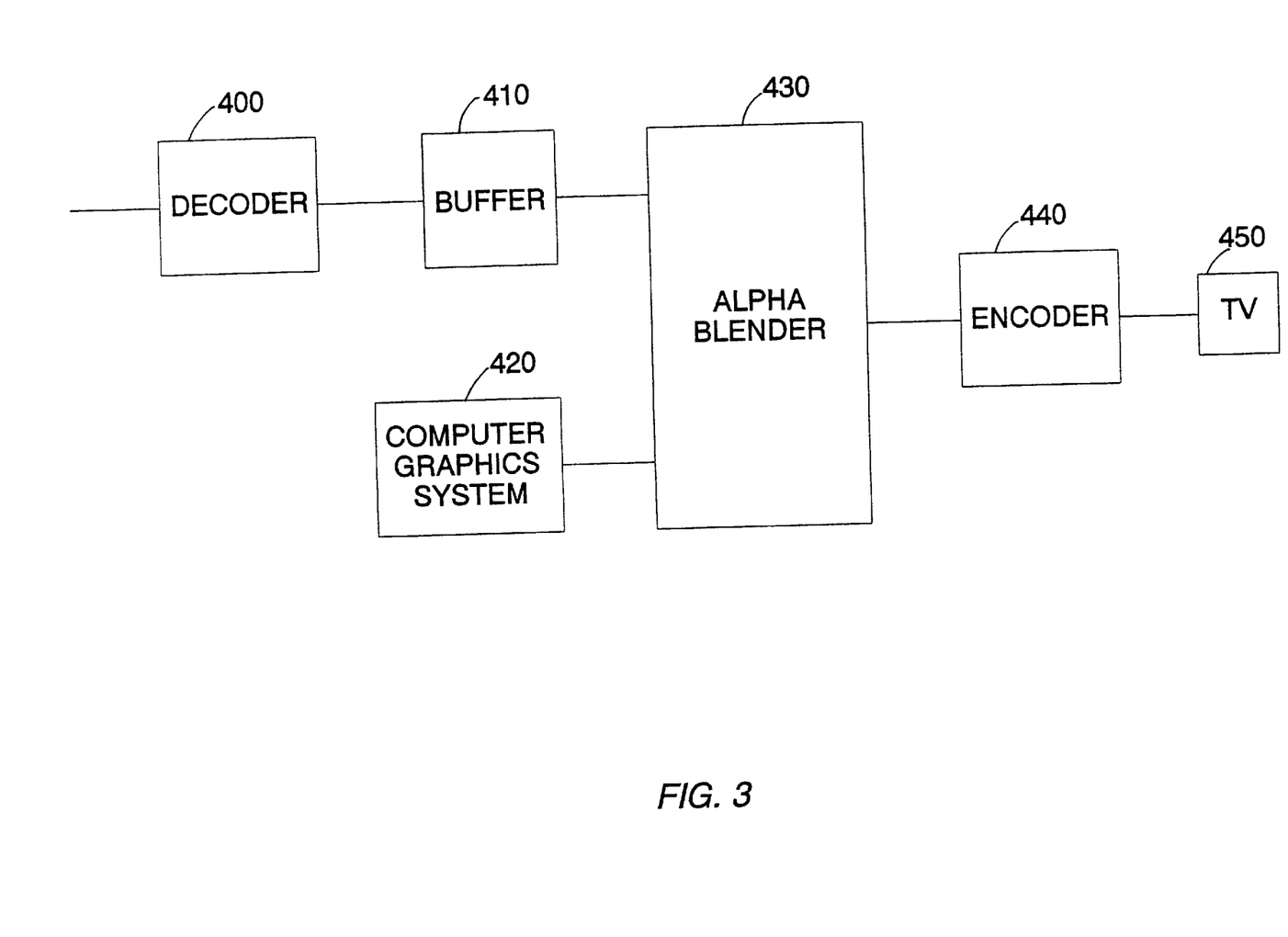
FIG. 3 is a block diagram illustrating a possible system in which a data processing circuit in accordance with preferred embodiments may be used.

FIG. 3 is a block diagram illustrating such a Set-Top Box system. A video stream is passed via decoder 400 and buffer 410 to an alphablender circuit 430 in accordance with preferred embodiments of the present invention. The video stream may be from a number of different sources, such as a satellite, telephone/network modem, tuner or video player. Further, the computer graphics system 420 generates a second video stream and also controls the alphablender circuit by specifying the S' value. The output from the alphablender 430 is then passed via an encoder 440 to a TV set 450 where the blended video is then displayed.

Typically, the configuration shown in FIG. 3 would use the high precision, slow speed mode. However, the STB may support other output devices such as LCD panels or high resolution computer monitors that might need to use the single-cycle, quick mode of operation, in which the alphablender circuit 430 performs a less precise multiplication.

For the purposes of describing a preferred embodiment, a Modified Booth system has been described. However, it will be apparent to those skilled in the art that other suitable summand generators may be used instead of Booth based summand generators. However, a Modified Booth system is particularly suited to VLSI implementation of multipliers, for the following reasons. The Booth based summand generator system uses a recoding scheme that allows fewer partial products to be generated for a given multiplier. This allows faster multipliers to be produced since the delay through the subsequent adder stage is reduced. The complexity of the adder stage is also reduced. Further, the Modified Booth structure is cheap to implement, requiring only simple inversion or shifting of the data. Additionally, the Booth based summand generator structure is regular making tight VLSI layout easier to achieve, thus reducing effort/area of the final circuit.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing circuit for performing arithmetic processing on data signals input to the circuit, said circuit comprising:

a plurality of input terminals, each input terminal arranged to receive one of said data signals to be processed;

a plurality of interconnected arithmetic processing units, one processing unit corresponding to each input terminal, each of said processing units applying an arithmetic processing operation to the data signals received at the corresponding input terminal; and a selector for routing the data signals to the corresponding arithmetic processing units in a first mode of operation, or for routing a selected one of said data signals to said plurality of arithmetic processing units in a second mode of operation;

whereby, in said first mode of operation, data signals arriving at said input terminals are processed independent from each other and in parallel by said corresponding arithmetic processing units to a first level of precision, and, in said second mode of operation, at any point in time, one of said data signals is processed by said plurality of arithmetic processing units to a second level of precision, wherein said second level is a higher level of precision than said first level.

2. A data processing circuit as claimed in claim 1, further comprising a first adder circuit for receiving processed data signals output by said arithmetic processing units in said second mode of operation, and for generating an output signal corresponding to the combined outputs of said plurality of arithmetic processing units.

3. A data processing circuit as claimed in claim 1, wherein said arithmetic processing units are summand generator units which are arranged to receive a multiplier value and to apply said multiplier value to data signals passed to said summand generator units by said selector in order to generate partial products.

4. A data processing circuit as claimed in claim 1, wherein said data signals are digital video signal streams.

5. A data processing circuit as claimed in claim 2, further comprising a plurality of adder circuits, one corresponding to each of said arithmetic processing units, each adder being arranged in said first mode of operation to receive the processed data signals output by the corresponding arithmetic processing unit, and to generate a result determined by adding a number of said processed data signals output by said corresponding arithmetic processing unit.

6. A data processing circuit as claimed in claim 5, wherein each said summand generator unit other than a first summand generator unit has an input for receiving, in said second mode of operation, one or more least significant bit values of said multiplier value, said one or more least significant bit values received at said input of each said summand generator unit being generated by a preceding one of said interconnected summand generator units.

7. A data processing circuit as claimed in claim 3, wherein said summand generator units are Booth based summand generator units.

8. An alphablender circuit, comprising a data processing circuit as claimed in claim 4.

9. A data processing circuit as claimed in claim 5, wherein one of said plurality of adder circuits comprises said first adder circuit, said first adder circuit being arranged in said first mode of operation to receive processed data signals only from the corresponding arithmetic processing unit, and in said second mode of operation to receive processed data signals output by said plurality of arithmetic processing units.

10. A data processing circuit as claimed in claim 6, wherein said one or more least significant bit values received at said input of each said summand generator unit are one or more most significant bit values of the multiplier value from said preceding interconnected summand generator unit.

11. A method of operating a data processing circuit to perform arithmetic processing on data signals input to the circuit, the method comprising the steps of:

receiving at each of a plurality of input terminals one of said data signals to be processed;

determining a mode of operation of the data processing circuit;

in a first mode of operation, routing the data signals at each said input terminals to a corresponding arithmetic processing unit for processing, the data processing circuit comprising a plurality of interconnected arithmetic processing units, one corresponding to each input terminal, and operating each arithmetic processing unit independently from the other said arithmetic processing units to apply an arithmetic processing operation to the corresponding data signal; and in a second mode of operation, routing a selected one of said data signals to said plurality of arithmetic processing units and operating the plurality of arithmetic processing units together to apply the arithmetic processing operation to the selected data signal; whereby, in said first mode of operation, data signals arriving at said input terminals are processed in parallel by said corresponding arithmetic processing units to a first level of precision, and, in said second mode of operation, at any point in time, one of said data signals is processed by said plurality of arithmetic processing units to a second and higher level of precision.

12. A data processing circuit for performing arithmetic processing on data signals input to the circuit, said circuit comprising:

a plurality of input terminals, each input terminal arranged to receive one of said data signals to be processed;

a plurality of interconnected arithmetic processing units, one processing unit corresponding to each input terminal, each of said processing units applying an arithmetic processing operation to the data signals received at the corresponding input terminal; and a selector for routing the data signals to the corresponding arithmetic processing units in a first mode of operation, or for routing a selected one of said data signals to said plurality of arithmetic processing units in a second mode of operation;

whereby, in said first mode of operation, data signals arriving at said input terminals are processed independent from each other and in parallel by said corresponding arithmetic processing units to a first level of precision, and, in said second mode of operation, at any point in time, one of said data signals is processed by said plurality of arithmetic processing units to a second level of precision, wherein said second level is a higher precision than said first level, a first adder circuit for receiving processed data signals output by said arithmetic processing units in said second mode of operation, and for generating an output signal corresponding to the combined outputs of said plurality of arithmetic processing units, a plurality of adder circuits, one corresponding to each of said arithmetic processing units, each adder being arranged in said first mode of operation to receive the processed data signals output by the corresponding arithmetic processing unit, and to generate a result determined by adding a number of said processed data signals output by said corresponding arithmetic processing unit.

13. A data processing circuit as claimed in claim 12 wherein one of said plurality of adder circuits comprises said first adder circuit, said first adder circuit being arranged in said first mode of operation to receive processed data signals only from the corresponding arithmetic processing unit, and in said second mode of operation to receive processed data signals output by said plurality of arithmetic processing units.

* * * * *